Nov. 28, 1961          P. WEBER          3,011,125
MEASURING AND/OR RECORDING APPARATUS
Filed May 25, 1959          2 Sheets—Sheet 1
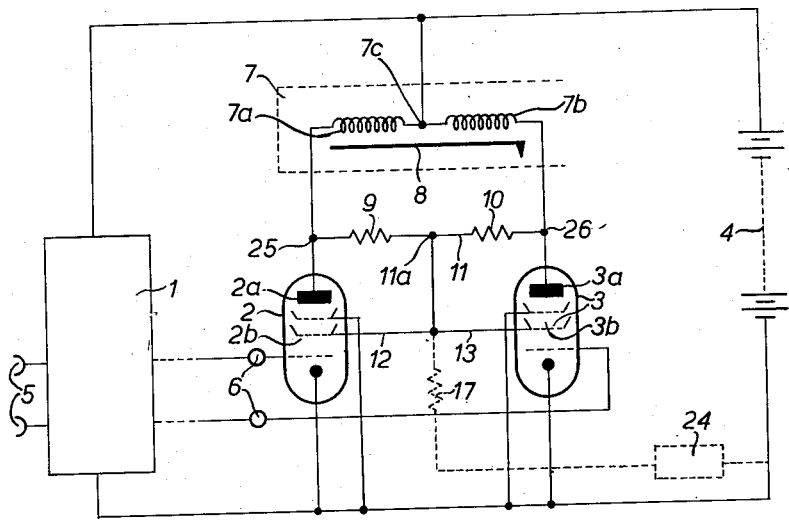
— FIG. 1.—
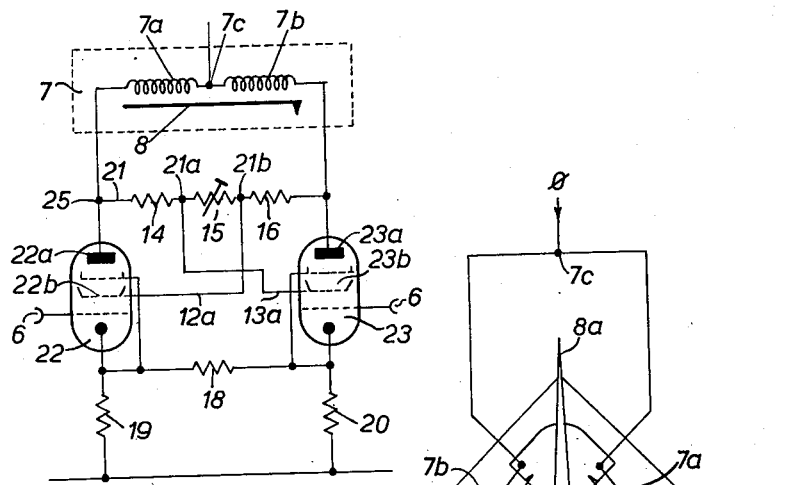
— FIG. 2.—
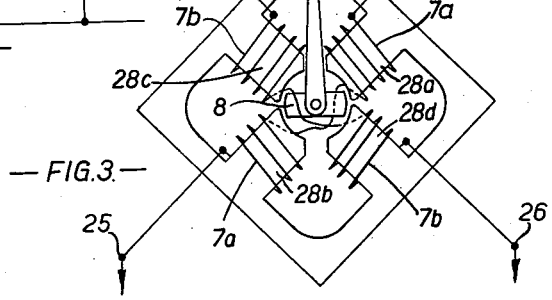
— FIG. 3.—
Paul Weber   INVENTOR
BY
ATTORNEY Nov. 28, 1961   P. WEBER   3,011,125
MEASURING AND/OR RECORDING APPARATUS
Filed May 25, 1959   2 Sheets-Sheet 2
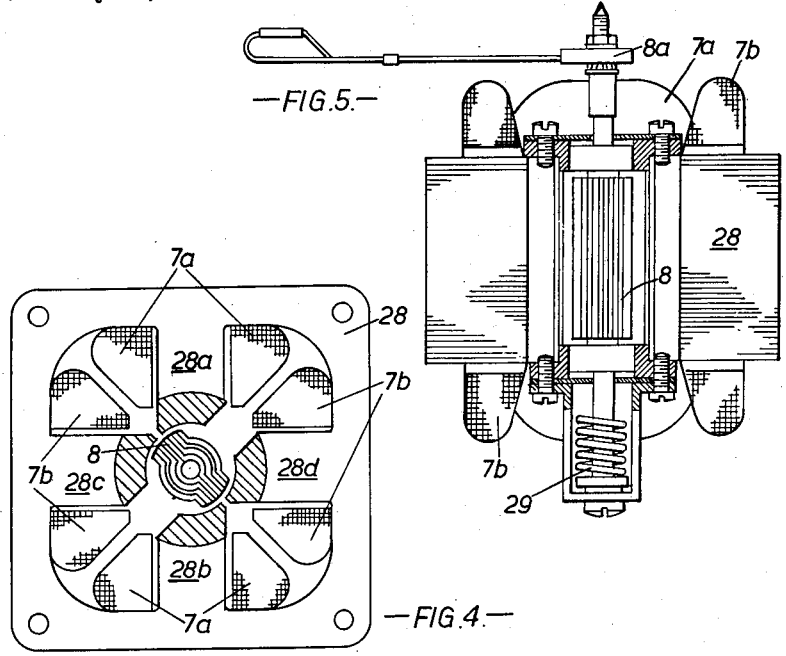
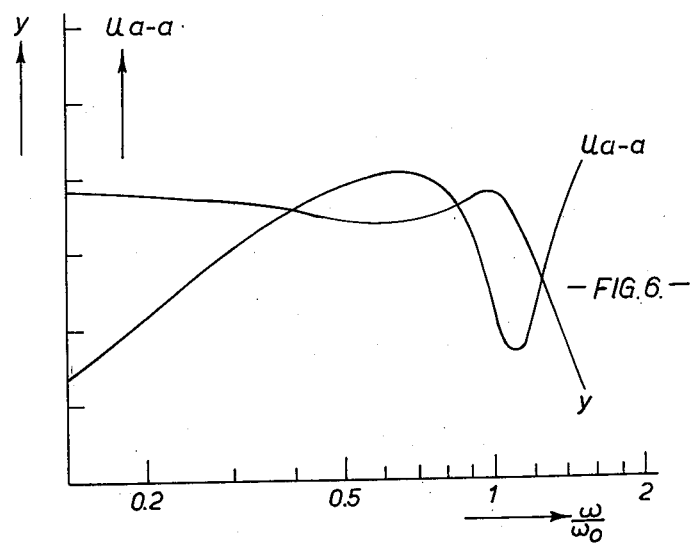
Paul Weber INVENTOR
BY
ATTORNEY United States Patent Office
3,011,125
Patented Nov. 28, 1961

3,011,125
MEASURING AND/OR RECORDING
APPARATUS
Paul Weber, Freiburg im Breisgau, Germany, assignor to Fritz Hellige & Co., G.m.b.H., Freiburg im Breisgau, Germany
Filed May 25, 1959, Ser. No. 817,967
Claims priority, application Germany May 27, 1958
5 Claims. (Cl. 324—123)

The present invention relates to measuring and/or recording apparatus.

It is known to equip amplifiers of measuring and/or recording apparatus with a push-pull output stage having screen grid tubes for operating a moving-iron type meter. Due to the push-pull arrangement, distortion and sensitivity to interference from the supply voltages and to push-pull interference signals from the input of the amplifier are reduced, as is well known.

In known registering and recording apparatus difficulties often occur due to the impedance of the meter and due to its matching to the output stage of the amplifier, since the meter impedance is very frequency-dependent in amount and phase. For medical and technical uses, however, it is required that indications recorded by the meter should be a substantially true picture of the input voltage of the amplifier, i.e. the indication must be largely free of amplitude and phase distortion.

An object of the present invention is to provide an amplifier circuit in which it is not necessary to compensate for frequency effects on amplitude and phase by means of corrections and balancing circuits so that consequent feed-back effects on earlier amplifier stages and the source of the voltage to be measured are obviated.

Finally, the invention stipulates that the push-pull power output amplifier stages are to be equipped with screen grid tubes. By this feature it is possible for the high output or driving voltages, which are necessary for certain frequencies, to be obtained from its output with the lowest possible amplifier operating voltage for such high amplifier efficiencies can be achieved only with screen grid tubes. These also have the advantage of a comparatively high anode resistance, which is also desirable so that the damping resistance necessary for the meter can be incorporated substantially as a constant ohmic resistance. Against this the amplifier anode resistance which is inconstant with respect to time, ought to be of as little effect as possible.

A measuring and/or recording apparatus according to the present invention comprises at least an amplifying system formed of two screen grid tubes arranged in push-pull, operable in response to voltage input signals being applied to the control grids of the tubes, a source of electromotive force energizing the amplifying system, and a moving iron meter responsive to current signals from said amplifying system by being interconnected between the anodes of said screen grid tubes and the positive pole of the source of electromotive force, said moving instrument having a rotatably mounted spring-loaded soft iron armature, a magnetic frame substantially only of soft iron, and a pair of electromagnetic exciter windings on said frame, said exciter windings being differentially connected with their one ends common to the positive pole of a voltage source and with their other ends connected respectively to the anodes of the two screen grid tubes of said amplifying stage, the anodes of the two screen grid tubes in the push-pull circuit being also differentially connected to one another by way of an impedance-loaded branch bridging said exciter windings of the meter, to which bridging branch two individual supply leads of the screen grids are substantially directly connected so that magnetic excitation of each magnet core of the meter is effected substantially only by the addition of the anode and screen grid currents, and separate direct current exciter coils and/or permanent magnets are not required.

Preferably such an amplifying system according to the invention is provided as the power output stage of an amplifier and may be combined with an input stage, essentially a push-pull input stage of any kind, capable of furnishing anti-phase signals, which are to be applied to the control grids of the power output stage.

The invention is further described by way of example with reference to the accompanying drawings, in which:

FIG. 1 is a circuit diagram showing the basic construction of a power amplifier of apparatus according to the present invention, FIG. 2 is a circuit diagram of a development of the output amplifier stage of FIG. 1, FIG. 3 is a schematic view of a preferred cross coil circuit of the exciter windings of the meter magnet frame of the amplifier of FIG. 1 or 2, FIG. 4 is a radial cross section of the meter of FIG. 3, FIG. 5 is an axial cross section of the meter of FIG. 3, and FIG. 6 is a graph illustrating characteristics of the circuit of FIG. 1 if not provided with the features of the invention.

Referring to FIG. 1, measuring and/or recording apparatus constructed according to the present invention, comprises preferably an input amplifier stage 1 (illustrated schematically) which, for example, contains at least two tubes in a push-pull circuit, in which stage electric measuring impulses received at input terminals 5 are amplified and transmitted through the terminals 6 to the two control grids of the tubes 2 and 3 of the power amplifier output stage. The tubes 2 and 3 are screen grid valves in a push-pull circuit arrangement. Furthermore the apparatus includes a direct current source 4 for the supply of current to the input amplifier stage 1 and the power amplifier stage 2, 3 thus energizing the system. A soft iron meter 7 (shown schematically and outlined in broken lines) has differential electromagnetic exciter windings 7a, 7b and a rotatably mounted spring-loaded soft-iron armature 8 carrying an indicator or writing arm 8a as shown in FIG. 3. One end of each of the exciter windings 7a and 7b is respectively connected to anodes 2a and 3a of the screen grid tubes 2 and 3. The other ends are interconnected at 7c and connected to the positive pole of the current source 4.

According to the invention, a branch lead 11 having two impedances 9 and 10 is interconnected between the anodes 2a and 3a of the power output stage, thus bridging the two exciter windings 7a, 7b of the meter, through which impedances the anodes 2a and 3a of the screen grid tubes are differentially arranged with respect to the branching point 11a between the two impedances. According to another feature of the invention, the two screen grids 2b, 3b of the screen grid tubes 2 and 3 are connected substantially directly to this one intermediate point 11a of this branch 11 or respectively to two various intermediate points, as shown in FIG. 2, by their common supply leads 12, 13 so that they are fed with current through the two impedances 9 and 10.

Thus the current-source 4, the electromagnetic exciter windings 7a and 7b of the meter 7, the screen grid tubes 2 and 3 and the impedance loaded branch 11 form a bridge circuit, the source 4 having conjugate position to the branch 11, the tube 2 having conjugate position to the exciter winding 7b and the tube 3 having conjugate position to the exciter winding 7a in the bridge circuit. This feature explains the possibility of deriving feed-back signals from the branch 11 to the screen grids to compensate the frequency-dependence of the impedance of the meter 7.

As a consequence of this circuit arrangement, the anodes 2a and 3a, of the two screen grid tubes are decoupled by the two impedances 9 and 10. The latter are also preferably proportioned so that sufficient damping is obtained for the meter 7. The voltage induced in the meter can be compensated in fact both by the anode resistances of the amplifier valves 2, 3 and by way of the anode decoupling impedances 9, 10 in parallel therewith. The magnitude of this impedance 9, 10 is not very critical for the correct operation of the amplifier, so that its value can preferably be determined with respect to the desired damping. At the same time, the anode potential is selected such that the operating field of the amplifier is favorable for the value of this impedance determined by the damping.

Finally, the magnetic excitation of the meter 7 excited by the anode current supplemented by the screen grid current, may be further strengthened by a current taken additionally from the electric center of the anode decoupling impedances 9, 10 defined by the branching point 11a. This current may according to another feature of the invention be supplied to any desired utilization device 24 by way of an additional impedance 17, indicated in FIG. 1 by broken lines which are interconnected in series in a conductor leading from the screen grids to the negative pole of source 4.

In the circuit shown in FIG. 1, the two screen grids 2b, 3b are kept forcibly always on the same potential. Compared with this, in a further development of the invention, as shown in FIG. 2, the screen grids 22b, 23b are fed from separate branch points 21a, 21b in an anode decoupling impedance branch 21 which branch 21 is split for this purpose into three impedance components 14, 15, 16. Consequently the forced equality of the two screen grid potentials no longer exists and a portion of the inter-anode potential is returned to the screen grids 22b, 23b. This feed-back could in principle be selected as a negative feed-back instead of a positive feed-back. A positive feed-back as shown in FIG. 2 has, however, proved to be very favorable.

Resistors 19 and 20 are inserted in the cathode supply leads of the valves 22 and 23. In addition, there is a connection between the two cathodes through a resistor 18. These resistors, 18, 19, 20 are intended to effect a current feed-back and thus to increase the anode resistance of the amplifier valves so that the anode decoupling impedances 14, 15, 16 determine the damping for the meter 7 to an increased extent.

A cross coil arrangement of the exciter winding 7a, 7b on the principle shown in FIG. 3 and constructed as shown in FIG. 4 and 5 is to be preferred for the soft iron meter. The preferred construction has four electromagnetic poles on the magnet frame 28, of which the poles 28a and 28b are excited by two windings, connected in series and forming together the exciter-winding 7a, and of which the two other poles 28c and 28d are excited by two other windings, connected in series and forming together the exciter-winding 7b. The windings are connected together at the point 7c and connected to the positive pole of the current source. The other ends 25, 26 of the windings are attached to the anodes of the amplifier tubes.

A rotary armature 8 of soft iron is disposed with a gap between the four electro magnet poles 28a, 28b, 28c and 28d and carries the writing recorder or the meter indicator 8a. When there is no excitation it is retained in its defined inoperative position by the return spring 29.

FIG. 6 is a graph showing the voltage $U_{a-a}$ between the anodes of the valves 2 and 3 of FIG. 1 and the peak deflection y of the meter indicator 8a plotted as functions of the ratio of the input frequency W to the natural frequency $W_0$ of the meter indicator for an input voltage of constant amplitude and with no positive feed-back; that means of the invention is not applied. As can be seen, a maximum of the alternating voltage $U_{a-a}$ between the anodes of the valves 2 and 3 corresponds to a minimum meter deflection y and occurs at a value of $W/W_0$ of approximately 0.8, and the sharply defined minimum of the anode alternative voltage $U_{a-a}$ corresponds approximately to a maximum of the deflection y at a value of $W/W_0$ of approximately 1.2. Accordingly it is understandable that feed-back of the anode alternating voltage in a positive sense by means of the bridging conductor 11 and the screen grids 2a, 3a connected to that conductor, decreasing the internal resistance of the pentodes, if the resistance of the meter increases in dependence on frequency and vice versa has a compensating effect on the undesirable waviness of the amplitude frequency characteristic $y=f(W)$. If an alternating current is impressed from the preamplifier 1 on the control grid terminals 6, the current in one exciter-winding 7a or 7b decreases, whereas the current in the other winding increases in the impressed cycle, thus turning the soft-iron armature 8 in the direction of those poles, the winding of which conducts the largest current, and indicating the impressed alternating current, what is known in the art.

In the circuits of the present invention, as forming the base of FIGS. 1 and 2, the sum of the anode and screen grid currents contributes fully and exclusively to the standing direct current excitation of the meter 5. Consequently, any superimposed current is fully utilized. Additional members, such as special connections, current sources and series resistors for the screen grid leads are unnecessary. The level of the standing magnetic field excitation is continually higher, compared with an otherwise similar construction with a separate screen grid current supply. Due to the quadratic dependence of the power exerted by the energized magnets by induction, the sensitivity of the meter is greater with a larger meter output. For amplifiers of recording apparatus this is an important advantage, because the inertia of the necessary writing indicator 8, 8a which is not unlimitedly easy to construct, can be overcome only by a comparatively strong force, particularly when recording high frequencies, e.g. in the recording of heart currents and heart sounds. The bridging branches 11 of FIG. 1 and 21 of FIG. 2 loaded with the impedances 9, 10 or 14, 15, 16 respectively take over a multiple function. Apart from the fact that they efficiently decouple the two anodes of the screen grid valves, they act as a means of damping for the meter, a feature which the valves alone, owing to their high anode resistance cannot accomplish. The described feed-back function of that bridging branch 11 is also a special advantage. Particularly, however, these impedances 9, 10 or 14, 15, 16, which may be of purely ohmic nature, can take over essential correction functions which are otherwise performed by separate correction members and adjusting devices, such as frequency filters in input stage 1. Altogether, an unexpected simplification of amplifiers for measuring and/or recording apparatus is thus obtained by the circuit constructions of the present invention.

It may also be mentioned, as a special advantage of the invention, that the meter can be separated from the amplifier even when working, without any danger to the amplifying tubes since the screen grids, together with the anodes become de-energized. In the normal connection of screen grid valves in which the screen grids are fed directly from the power supply, that is to say, by-passing the meter, the interruption of the meter leads would, on the other hand, result in overheating of the screen grids and, consequently, in the destruction of the valves if, previously, the screen grid supply leads are not also interrupted.

Finally the circuit constructed according to the present invention, in which the means of correction for the effect of frequency on amplitude and phase are quite outside the control grid circuits of the output valves, has the advantage that the adjustment of the said correction members has no appreciable feed-back effect on the preceding input amplifier.

What is claimed is:

1. In measuring apparatus, an amplifier comprising a source of electromotive force energizing the amplifier, a pair of electron tubes connected in push-pull in said amplifier and each having a cathode, a control grid, a screen grid and an anode, means for deriving from an input signal a first signal for application to the control grid of one of said tubes and a second signal for application to the control grid of the other of said tubes, said signals being in anti-phase, a meter in the anode circuit of said tubes, said meter comprising a soft iron magnet frame in part defining an air gap, a soft iron armature, means rotatably mounting said armature in said air gap and an electromagnet exciter system comprising at least two exciter windings for establishing superposed magnetic fields in said air gap in mutually inclined directions, each of said windings having a first end and a second end, the first ends of said windings being common to the positive terminal of said source, the second end of one of said windings being connected to the anode of one of said electron tubes, the second end of another of said windings being connected to the anode of the other of said electron tubes, an impedance-loaded circuit connecting the anode of one of said tubes to the anode of the other of said tubes, means connecting the screen grid of the first of said tubes to an intermediate point in said impedance-loaded circuit, and means connecting the screen grid of the other of said tubes to an intermediate point in said impedance-loaded circuit, the impedance loaded circuit thus forming a feedback circuit by its connection to the screen grids of the valves.

2. In measuring apparatus, the combination comprising an amplifier, a pair of electron tubes connected in push-pull in said amplifier and each having a cathode, a control grid, a screen grid and an anode, a negative feed-back circuit having a first resistor connecting the cathode of one of said tubes to a source of negative potential, a second resistor connecting the cathode of the other of said tubes to said source of negative potential and a third resistor coupling said cathodes, means for deriving from an input signal a first signal for application to the control grid of one of said tubes and a second signal for application to the control grid of the other of said tubes, said signals being in anti-phase, a meter in the anode circuit of said tubes, said meter comprising a soft iron magnet frame in part defining an air gap, a soft iron armature, means rotatably mounting said armature in said air gap and an electromagnet exciter system comprising at least two exciter windings for establishing superposed magnetic fields in said air gap in mutually inclined directions, each of said windings having a first end and a second end, the first ends of said windings being common to a source of positive potential, the second end of one of said windings being connected to the anode of one of said electron tubes, the second end of another of said windings being connected to the anode of the other of said electron tubes, an impedance-loaded circuit connecting the anode of one of said tubes to the anode of the other of said tubes, means connecting the screen grid of the first of said tubes to an intermediate point in said impedance-loaded circuit, and means connecting the screen grid of the other of said tubes to an intermediate point in said impedance-loaded circuit.

3. In measuring apparatus, the combination comprising a power output amplifier, a pair of screen grid tubes in said amplifier connected in push-pull, each of said tubes including control grids, means for deriving from an input-signal a first signal for application to the control grid of one of said tubes and a second signal for application to the control grid of the other tube, said signals being in anti-phase, and a moving iron meter, said meter having a magnet frame substantially only of soft iron, a soft iron armature, means for rotatably mounting said soft iron armature within said magnet frame, said frame having first and second pairs of poles, the poles of each pair being substantially diametrically opposed to one another with respect to said armature, and four exciter windings on said magnet frame, one winding being disposed on each pole, the exciter windings on one pair of poles being connected in series between a positive pole of an electricity supply and the anode of one of said tubes, the exciter windings on the other pair of poles being connected in series to said positive pole of an electricity supply and the supply and the anode of the other of said tubes, an impedance-loaded circuit differentially connecting the anode of one of said tubes to the anode of the other of said tubes, means connecting the screen grid of one of said tubes to an intermediate point in said impedance-loaded circuit and means connecting the screen grid of the other of said tubes to an intermediate point in said impedance-loaded circuit.

4. Apparatus as set forth in claim 3 comprising a recording pen attached to the armature of said meter.

5. In measuring apparatus, the combination comprising an amplifier, a pair of electron tubes connected in push-pull in said amplifier and each having a cathode, a control grid, a screen grid and an anode, means for deriving from an input signal a first signal for application to the control grid of one of said tubes and a second signal for application to the control grid of the other of said tubes, said signals being in antiphase, a meter in the anode circuit of said tubes, said meter comprising a soft iron magnet frame in part defining an air gap, a soft iron armature, means rotatably mounting said armature in said air gap, spring means for urging said armature towards a predetermined angular position in said air gap and an electromagnet exciter system comprising at least two exciter windings for producing mutually inclined superposed magnetic fields in said air gap, the angular position of the resultant of said fields varying with the distribution of current between said two exciter windings, each of said windings having a first end and a second end, the first ends of said windings being common to a source of positive potential, the second end of one of said windings being connected to the anode of one of said electron tubes, the second end of another of said windings being connected to the anode of the other of said electron tubes, and a positive feed-back circuit formed by an impedance loaded branch circuit which comprises first, second and third impedances, the first impedance being connected between the anode of said first tube and the screen grid of said second tube, the second impedance being connected between the screen grid of said first tube and the screen grid of said second tube and the third impedance being connected between the screen grid of said first tube and the anode of said second tube.

References Cited in the file of this patent

UNITED STATES PATENTS

| 1,549,587 | Marvin | Aug. 11, 1925 |
| 1,586,533 | Peterson | June 1, 1926 |
| 2,506,143 | Edelman | May 2, 1950 |
| 2,521,828 | Chatterton | Sept. 12, 1950 |